United States Patent
Pogorski et al.

(10) Patent No.: US 6,221,456 B1
(45) Date of Patent: Apr. 24, 2001

(54) THERMAL INSULATION

(76) Inventors: Louis August Pogorski, 339 Maple Leaf Drive, Toronto, Ontario (CA), M6L 1P4; Stephen Richard Pogorski, 34 Rockcastle Drive, Etobicoke, Ontario (CA), M9R 2V1

( * ) Notice: Subject to any disclaimer, the term of this patent is extended or adjusted under 35 U.S.C. 154(b) by 0 days.

(21) Appl. No.: 08/280,841

(22) Filed: Jul. 26, 1994

(51) Int. Cl.$^7$ .................................................. B32B 5/16
(52) U.S. Cl. ................. 428/69; 428/71; 428/74; 428/75; 428/76; 220/426; 220/429
(58) Field of Search ........................ 428/69, 76, 74, 428/75, 71; 220/426, 429

(56) References Cited

U.S. PATENT DOCUMENTS

| | | | |
|---|---|---|---|
| 3,695,483 | 10/1972 | Pogorski | 220/9 C |
| 3,698,588 | 10/1972 | Pogorski | 220/9 C |
| 3,993,811 | 11/1976 | Walles | 428/35 |
| 4,159,359 | 6/1979 | Pelloux-Gervais | 428/76 |
| 4,399,175 | 8/1983 | Kummermehr | 428/76 |
| 4,636,415 | 1/1987 | Barito | 428/68 |
| 4,647,498 | 3/1987 | Walles | 428/288 |
| 4,668,555 | 5/1987 | Uekado | 428/69 |
| 4,681,788 | 7/1987 | Barito | 428/68 |
| 4,798,753 | * 1/1989 | Abuaf et al. | 428/69 |
| 5,376,449 | * 12/1994 | Harris et al. | 428/69 |

* cited by examiner

*Primary Examiner*—Alexander Thomas
(74) *Attorney, Agent, or Firm*—Friederichs Law Firm, PLC

(57) ABSTRACT

A lightweight, partially evacuated load-supporting insulation panel comprising an outer gas-impermeable envelope and an inner gas-permeable envelope. The inner envelope is filled with a mixture of coarse gas-permeable granules and fine gas permeable particles, void spaces formed within and between said granules and particles containing a gas of low thermal conductivity. An intermediate gas impermeable envelope may also be used.

25 Claims, 1 Drawing Sheet

THERMAL INSULATION

FIELD OF THE INVENTION

This invention relates to an improved type of thermal insulation that is lightweight, easy to apply, flexible, capable of supporting compressive loads and has high resistance to all modes of heat transfer. More particularly this invention relates to thermal insulation panels that are efficient, lightweight, structurally strong, load bearing, easy to apply, environmentally friendly, and which may be flexible. In preferred embodiments, the invention relates to insulation that is especially suited for insulating freezers, refrigerators, hot water heaters, and other domestic or institutional appliances, for insulating medium and low temperature vessels and pipes, and for special building applications.

BACKGROUND OF THE INVENTION

The main function of thermal insulation is to decrease the transfer of heat into or from an insulated system, whichever the case may be, in order to protect a device, such as an appliance, vessel, pipeline or other apparatus, from the effects of a gain or a loss of heat from or to the outside environment.

There are increasing concerns about the energy levels consumed by residential appliances, such as freezers, refrigerators and hot water heaters, which have created a need for an efficient insulation capable of meeting a demanding combination of technical, economic and environmental requirements. High thermal resistance e.g. R in excess of 8 hr ft$^2$ °F./inch BTU, low density e.g. under 10 lbs/ft$^3$, adequate structural strength, load-bearing capability e.g. around 2000 lbs/ft$^2$, flexibility, ease of application, low cost and a low aging factor are all important properties. Thermal resistance R is measured by the procedure of ASTM C1114-89.

Heat may be transferred from a heat source to the heat receiver by one or more of the heat transfer modes viz. conduction, convection and radiation. Conduction involves heat transfer due to interaction of atoms or molecules possessing a greater amount of kinetic energy with those possessing less. When the molecules are fixed in space, as in solid bodies, interaction of molecules responsible for thermal conduction arises from the elastic binding forces between the molecules. When the molecules are not fixed in space, as in gases or liquids, heat conduction is produced by the transfer of kinetic energy during molecular collisions.

Convection involves heat transfer by the actual movement of a fluid. When the fluid is free to move as in gases or liquids, portions of the fluid in contact with the heat source become hotter, expand, become less dense and rise. Their place is taken by the denser and colder portions of the fluid. This process generates natural convection currents that in gases at ordinary pressures are responsible for the major proportion of the heat that is transferred. The contribution of convection to the overall heat transfer in a gas can be reduced or eliminated by lowering the gas pressure. Lowering the pressure of a gas contained within a vessel reduces the number of molecules of the gas per unit volume. When the pressure level is reached at which the distance between the walls of the vessel is much smaller than the length of the mean free path of the gas molecules at the given conditions, the convection contribution is effectively eliminated.

Radiation involves the transfer of radiant energy from a source to the receiver. A solid body at any temperature above absolute zero radiates energy. This radiation is electromagnetic in nature and takes place without the necessity of an intervening medium. A part of the radiant energy impacting a receiver is absorbed and a part is reflected by it. The contribution by radiation to overall heat conduction can be reduced by interposing radiation shields between the heat source and the receiver.

The contribution of each of the above modes to the overall heat transfer depends on the heat transfer medium as well as on the temperature and temperature differential between the heat source and the receiver. Under certain conditions, any one of the three modes may become controlling, while, under other conditions, the contribution of two or of all three modes of heat transfer may be significant. Combinations of component materials may be used to emphasize certain more desirable properties in an article and to suppress other less undesirable ones. The resultant composite multicomponent thermal insulations can have better overall structural characteristics and thermal insulating properties than those of the individual components thereof.

Thermal insulation is intended to reduce the contribution of all the modes of heat transfer to a practical minimum. It is usually made of poor heat conductors and may be comprised of one or two phases, usually solid and/or gas. Examples of thermal insulation include solid insulation panels made of low conductive materials, expanded foams, gas-filled or evacuated powders and fibrous materials, vacuum alone, opacified powders and multilayer insulations. Each of these types of insulation has its advantages, disadvantages and limitations. Thermal resistance, structural integrity and load-supporting capability are of paramount importance. The overall effectiveness of an insulation is considerably reduced when the insulation is not capable of supporting loads and when solid supports are required. The selection of a specific type of insulation for a particular type of service is made on the basis of a compromise between factors such as effectiveness, cost, ruggedness, compatibility, applicable temperature range, aging factor and ease of application.

Gas-filled, closed-cell plastic foams e.g. polystyrene, polyurethane, polyisocyanurate, are among the most economic and efficient existing types of insulation for medium temperature range applications. They have been extensively used for insulating freezers and refrigerators. Foam-type insulation has a cellular structure generated by the expansion of a foamable composition, often referred to as a foamable resin, plastic or polymer composition. It contains two phases, viz. a gas phase and a solid phase. The conductivity of foam insulation is determined by the sum of the heat flow through the gas contained within the cells and through the network of the plastic cell walls. The heat flow through the closed-cell foam insulation can be reduced by filling the cells with a low conductivity gas, by extending the length of the heat flow path through the solid phase, and by reducing the thickness of the cell walls.

The effectiveness of insulations is measured in terms of thermal resistance (a reciprocal of thermal conductivity) expressed as R/inch values (hr ft$^2$ °F./BTU inch), and often referred to as the R value. The highest practical R values of closed-cell foams are about 7–8, attainable by CFC-blown polyurethane or polyisocyanurate foams. The effective R values of closed-cell foam insulation tend to decrease with age due to a gradual replacement of the cell gas with more conductive air by the process of diffusion. Other disadvantages of closed-cell foams are relatively high coefficient of thermal expansion resulting in a tendency for closely-fitted insulation to crack during the temperature cycle of the appliance. Cavities are often found inside the foamed-in-place insulations. Moreover, current environmental regulations prohibit the use of ozone-destroying chlorofluorocarbons (CFCs). All practical substitutes have higher thermal conductivity and the replacement of CFCs with such substitutes results in a decrease of the thermal resistance of this type of insulation.

Thermal resistance of plastic foams could be enhanced by lowering the pressure of the gas contained within the foam cells to a very low level. This requires an open cell foam, located inside an impermeable casing which has been evacuated. Examples of this type of foam are given in U.S. Pat. Nos. 4,647,498 of Walles and 4,668,555 of Uekado et al. The R values attainable by such insulation are determined by the heat conduction through the cell walls, the conductivity of the interstitial gas and the residual convective heat flow. The disadvantages tend to be residual heat leak through the cell walls, high cost, poor load-supporting capability, and structural integrity limitations.

Gas-filled fibres or powders allow reduction of the heat flow by the modes of conduction, convection and radiation to a level unattainable with foam-type insulation. In the case of foams, the conductive heat path through the cell walls is continuous. In the case of powders or fibres, the conductive heat flow path from particle to particle is limited to the points of contact between the particles and is impeded by the phase discontinuities. The contribution of convective heat flow can be made very low or be entirely eliminated by reducing the interstitial gas pressure and/or reducing the size of the particles so that the equivalent diameter of the voids is equal to or smaller than the mean free path of the gas molecules at the given temperature and pressure. The contribution of radiation is reduced to a very low level as each particle acts as a radiation shield. Examples of nonevacuated and evacuated types of particle insulations are given in U.S. Pat. Nos. 3,695,483 to Pogorski and 4,681,788 to Barito et al.

Insulations made of compacted fibres or powders enclosed in gas-impermeable evacuated casings can attain R/inch values well in excess of 8. The main disadvantage of this type of insulation is cost and weight. The finer and the more compacted are the particles, the higher is the thermal resistance of the insulation, the load-supporting capability and the structural integrity of the insulation, but also the density is higher, the evacuation time required is longer and the cost is higher. Conversely, the lesser the compaction, the lower is the thermal resistance and the poorer is the structural integrity and load-supporting capability.

The foregoing discussion of the prior art indicates that previous types of insulation for moderate temperature service tend to have one or more undesirable characteristics, e.g., low thermal resistance, poor load-supporting capability, poor structural integrity, high density and/or high cost. Any of these factors can be serious enough to considerably affect or limit the usefulness of such types of insulation.

DESCRIPTION OF THE INVENTION

It has now been found that improvements may be obtained by using different types of particles or granules viz. a mixture of lightweight coarse granules to form a lightweight, low-conductive framework, giving the insulation its structural integrity and load-supporting capability, and lightweight fine particles to fill the void spaces and provide high resistance to all the modes of heat transfer. Coarse granules provide the load-supporting capability, whereas the fine particles filling the void spaces between the granules have to carry only a minor portion of the total load and can be packed to a much lesser density than would otherwise be required. The resulting composite insulation has a low density, load-supporting capability and good insulating characteristics.

In accordance with one aspect of the present invention, there is provided a lightweight, partially evacuated load-supporting thermal insulation panel comprising an outer gas-impermeable envelope and an inner gas-permeable envelope, said inner envelope being filled with a mixture comprising lightweight coarse gas-permeable or semi-permeable granules forming a load-supporting structural framework especially where the coarse granules occupy at least 30% of the volume of the panel, lightweight fine gas-permeable or semi-permeable particles occupying void spaces between the granules, and low thermal conductivity gas filling void spaces formed within and between said granules and particles.

In accordance with another aspect of the present invention, there is provided a lightweight, partially evacuated load-supporting thermal insulation panel comprising an outer gas-impermeable envelope, an intermediate gas-impermeable envelope and an inner gas-permeable envelope, said inner envelope being filled with a mixture comprising lightweight coarse gas-permeable or semi-permeable granules forming a load-supporting structural framework occupying at least 30% of the volume of the panel, lightweight fine gas-permeable or semi-permeable particles occupying void spaces between the granules, and low thermal conductivity gas filling void spaces formed within and between said granules and particles.

DETAILED DESCRIPTION OF THE INVENTION

Figure 1:
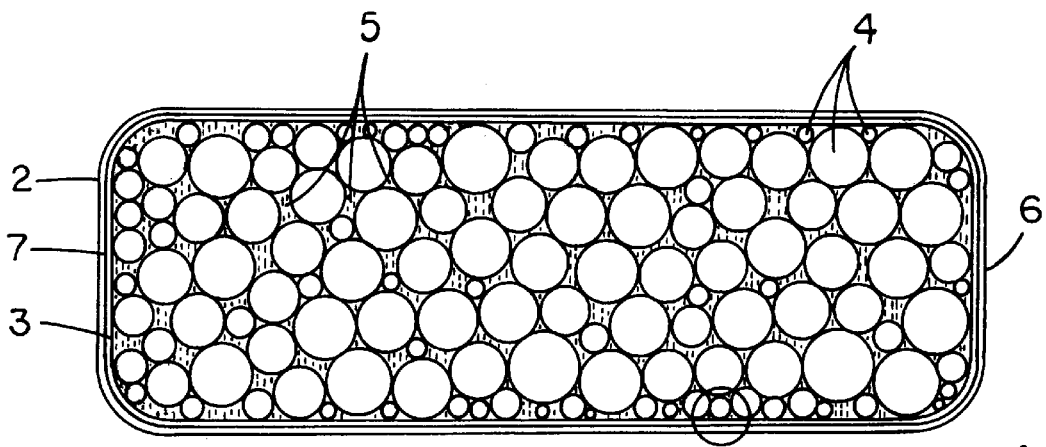
FIG. 1 is a schematic representation of a cross section of a composite insulation panel.

An insulation panel that is light weight, load bearing, and low cost can be made by enclosing within a flexible casing, consisting of an inner gas-permeable envelope, an optional intermediate gas-impermeable envelope and an outer gas-impermeable envelope, a compacted composite fill consisting of a plurality of lightweight particles and a low-conductive gas at sub-atmospheric pressure filling the unoccupied space. The particles have two distinct size ranges, referred to herein as lightweight coarse granules and lightweight fine particles. The bulk composition of the fill prior to its mixing and compaction is in the range of 1 to 10 parts by volume of the lightweight coarse granules and 1 to 10 parts by volume of the lightweight fine particles, especially in the range 1 to 5 parts by volume of the coarse granules and 1 to 5 parts by volume of the fine particles. In embodiments of the invention, the ratio of the diameters of the lightweight coarse granules to the lightweight fine particles is at least 50:1 and preferably at least 100:1. In preferred embodiments, the lightweight coarse granules occupy at least 25%, particularly at least 30% of the volume and especially at least 40% of the volume of the panel.

In embodiments of the invention, the lightweight coarse granules preferably have a nominal diameter of at least 1 mm, particularly greater than 2 mm, for instance greater than 2 mm up to 10 mm, and especially greater than 2 up to 4 mm, there preferably being a variety of sizes within that range. In other embodiments the coarse granules have a diameter of 0.01 to 2 mm. Similarly, the lightweight fine particles preferably have a nominal diameter of 10 Å to 1 mm, especially 0.001 to 0.1 mm. In preferred embodiments, the fine lightweight particles includes particles of a variety of sizes within this range and could be classified as being a mixture of fine and ultrafine particles i.e. significant proportions of particles with sizes from opposed ends of the above size range. In particular, in embodiments of the invention the lightweight coarse granules have at least 20% each of the medium and the fine granules on the bulk volume basis. Similarly, in embodiments of the lightweight fine particles, the particles have at least 20% of each very fine and ultrafine particles on the bulk volume basis.

In embodiments, the granules and the particles may be made of at least one of synthetic or volcanic glasses, diatomaceous earth, wood and plant fibres, intertwined synthetic or natural solid and hollow fibres, cellulose and its derivatives, coke, charcoal, activated charcoal, fly ash, carbon, silica, zeolites, ceramics, rubbers or plastics. Examples of plastics include at least one of porous or expanded forms of polyesters, polystyrene, polyurethane, polyisocyanurates, polyolefins, polyvinylchloride, epoxy resins, phenolic resins, urea formaldehyde, latex and silicone.

The primary function of the coarse granules is to form a lightweight framework, giving the insulation its structural integrity and its load-supporting capability. The primary function of the fine and optionally ultrafine particles is to decrease the heat transfer by convection to a practical minimum. The coarse granules may be of regular shapes, e.g. spherical, oval, cylindrical, tubular, or irregular shapes, e.g. twisted, elongated, curved, jagged. Their surfaces can be smooth or rough, fibrillated or fluffy. The fine particles are miniature versions of the coarse granules. They can also be in the form of tiny fleecy balls of twisted, hollow or solid fibres. Granules of a regular shape are preferred.

Figure 1A:
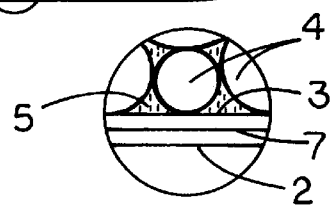
FIG. 1A is an expanded view of a portion of the panel of FIG. 1, as indicated by the circle.

FIG. 1 shows a cross-section of a panel, generally indicated by 1. Panel 1 has an outer gas-impermeable envelope 2 and an inner gas-permeable envelope 3, as well as an optional intermediate gas-impermeable envelope 7 that is shown in FIG. 1A. Outer envelope 2 and inner envelope 3 enclose a fill consisting of a plurality of coarse granules 4 and fine particles 5. Coarse granules 4 are shown as occupying a substantial part of the volume enclosed by inner envelope 3, and are in contact with each other. As shown in FIG. 1, coarse granules 4 are spherical in shape, although other shapes may be used. It will also be noted that coarse granules 4 are shown as being of a plurality of sizes i.e. as having a plurality of diameters. While coarse granules 4 may all be of the same or substantially the same diameter, it is preferred that a range of diameters of coarse granules 4 be used within the inner envelope 3. The voids or spaces between course granules 4 are filled with fine particles 5. Tab 6 is shown on outer envelope 2, and is the location of the seal used in the forming of panel 1, in particular the evacuating and flushing with a suitable gas during the formation of the panel 1.

FIG. 1A shows a cross-section of a portion of the envelope used to form panel 1. In FIG. 1A, outer envelope 2 and inner envelope 3 are shown as sandwiching a further gas-impermeable envelope 7. Envelope 7, also shown in FIG. 1, is an optional envelope. Coarse granules 4 and fine particles 5 are also shown in FIG. 1A.

Figure 2:
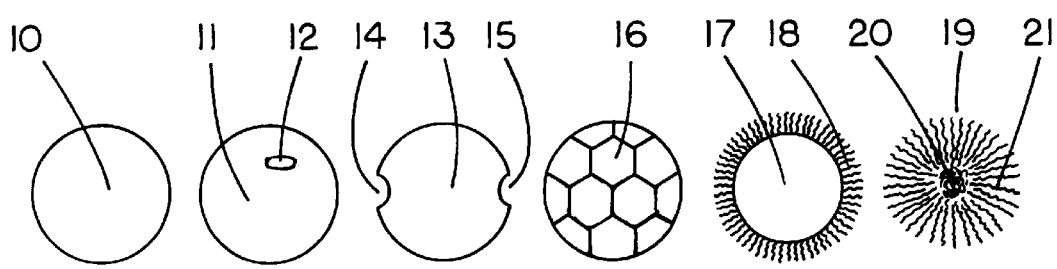
FIGS. 2 and 3 show schematic representations of a variety of granules of different shapes.
Figure 3:
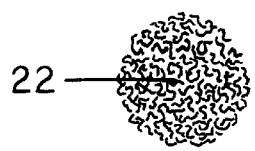

FIG. 2 shows examples of different granules that may be used in the panel. Granule 10 is a schematic representation of a thin wall single cell hollow spherical granule. Granule 11 is a schematic representation of a thin wall hollow spherical pierced granule, in which a hole in the granule is represented by 12. Granule 13 is a schematic representation of a thin wall hollow spherical pierced granule, in which holes 14 and 15 are shown. Granule 16 is a schematic representation of a thin wall, empty cell, multicell granule. Granule 17 is a schematic representation of a thin wall, hollow granule with a fluffy or fibrillated surface, represented by fluff 18. Granule 19 is a schematic representation of a granule with a fluffy or spiked surface in which the volume occupied by the fluff or spikes is large in relation to the volume occupied by the centre to which the fluff or spikes are attached. All such granules may be used, with some different effects, as well as other granules, as discussed above. The fine particles are microscopic versions of the granules represented in FIG. 2, or tiny fluffy balls 22 made of a plurality of intertwined solid or hollow fibres, as shown in FIG. 3.

The outer gas-impermeable envelope may be made from a laminate of plastic films or a laminate of plastic films with metal layers, especially metal layers sandwiched between plastic layers. An example of the latter would be a laminate formed from a film of a thermoplastic polymer and aluminum or stainless steel foil. The outer gas-impermeable envelope needs to have high impermeability to gases, as well as a flexibility to enable the panel to be shaped into the desired configuration. The outer gas impermeable envelope should have a high thermal resistance to impede thermal shunting.

The inner gas-permeable envelope may be made from a woven natural or synthetic fiber, for example jute or fibers formed from plastics e.g. formed from thermoplastic polymers, examples of which include nylon and polyester. In addition, the inner gas-permeable envelope may be made from fiberglass filaments.

One of the functions of the intermediate gas impermeable envelope is to provide an additional barrier that impedes gas diffusion into and from the thermal insulation panel. The intermediate envelope may be made from easy-to-seal thermoplastic films, such as polyethylene, or from other materials similar to that of the outer gas-impermeable envelope. The outer envelope of the panel may be covered by a protective plastic foam to provide protection against a rupture of the outer envelope due to external causes. Either the outer protective layer, the intermediate envelope, or both, can be omitted, if justified.

The granules may be made from a wide variety of natural or synthetic materials, as discussed above. It has been found that granules with properties that exhibit relatively low strength when tested on an individual granule exhibit substantial and often acceptable strength when compacted within the panel. Thus, granules that are fragile, thin walled, porous, semi-hollow or hollow and pierced and made from thin-wall plastic or glass materials that normally would be crushed by small forces have been found to exhibit strength and capability to bear loads when compacted under vacuum within an enclosing envelope.

In embodiments of the invention, a panel made of a plurality of coarse granules and fine particles enclosed in a casing consisting of a flexible gas-permeable inner envelope, and intermediate and outer gas-impermeable envelopes may be light weight, exhibit a high R value as an insulating panel and be capable of supporting loads up to and in excess of 2000 lbs/ft$^2$.

The lightweight granules and particles are granules and particles in which the particle volume ratio (PVR), defined as the ratio of the bulk volume of the individual granule or particle to the volume occupied by the solid part of its body is between 1 and 100, especially 2–100; as used herein, bulk volume is the largest volume occupied by the granule or particle. It is preferred that the ratio of the bulk volume of the lightweight coarse granules to the bulk volume of the lightweight fine particles prior to their mixing and compaction is between 0.2 and 10.

The panels of the invention may be made by feeding a mixture of coarse granules and fine particles into an envelope formed from a gas-impermeable outer envelope and a gas permeable inner envelope. The panel is then shaped and evacuated, and the gas, usually air, originally within the envelope, is replaced with a gas of low thermal conductivity. Some of the granules or particles enclosed within the inner envelope of the panel can act as gas getters. Getters adsorb or chemically bind gas molecules present within the panel and help the evacuation process. If the gas residing within the panel is predominantly an easily-adsorbable gas, such as hydrocarbons or chlorofluorohydrocarbons, and there is sufficient volume of getters present, the envelopes can be sealed and the desired vacuum level can be reached without or with only a minimal help of an external vacuum pump. Residual gases, such as oxygen, nitrogen, hydrogen, water vapour, can also be removed by suitable getters. Examples of the suitable getters include coarse granules and fine particles of charcoal, activated charcoal, silica gel, zeolite, aluminum, titanium, barium, calcium and magnesium. In preferred embodiments, the inner envelope contains at least 0.1% by weight, especially at least 0.2% by weight, of a getter.

It has been found that with the panels of the invention the evacuation step will proceed rapidly to a moderate level of vacuum.

If the material from which the granules or particles are made is gas semi-permeable or permeable, then by the process of diffusion the pressure and composition of the gas trapped within these granules or particles will equalize with the pressure and composition of the gas present on the outside. If the granules and particles are hollow and pierced, then by the free flow process the pressure and composition of the gas present inside these granules or particles will rapidly equalize with the pressure and composition of the gas present on the outside. Using these processes, the pressure of a gas trapped within hollow or gas-permeable coarse granules and fine particles can be reduced or the gas can be replaced by another gas.

It is preferred that the original interstitial gas within the envelope and, if applicable, the gas originally trapped within the coarse granules and fine particles be replaced by another gas having a lower conductivity and/or more desirable chemical characteristics.

The R value of the panel can be further enhanced by reducing the size of the fine particles and the internal gas pressure within the panel. Filling of the void space between coarse granules with a mix of fine and ultrafine particles increases the R value of the panel. In addition to decreasing the conductive heat flow, these fine particles depress the convection currents and decrease the convective heat flow through the gas-phase portion of the panel. The fine particles occupying the void space do not perform any significant load-bearing function. The coarse granules do. The fine particles do not have to be compressed to any great extent and the density of the intergranular void-space fill can be quite low. The resulting composite insulation panels have both a low density, especially under 10 lb/ft$^3$ and in embodiments under 8 lb/ft$^3$, and an R/inch value in excess of 8 and in embodiments in excess of 10.

The insulation panels of this invention, containing a plurality of spherical, oval or rounded granules, can be bent by the application of external forces and retain the newly acquired shape when the external bending force is removed. The insulation panels can be shaped in this way to conform to the shape of a rectangular, cylindrical or spherical vessels.

It is preferred that all or at least 60% by volume of the gas residing within the granules and within the voids within the panel is a gas that is of low thermal conductivity. Examples of such gases include argon, krypton, carbon dioxide, hydrochlorocarbons, hydrofluorocarbons, hydrochlorofluorocarbons, perfluorohydrocarbons, ethane, butane, propane, pentane, hexane, heptane or a mixture of two or more of such gases. Preferably the total pressure of the low conductivity gases is in the range of 0.001 to 500 millibar.

The panels may be used in a variety of end-uses generally characterized as using moderate temperatures e.g. in freezers, refrigerators, hot water heaters, and other domestic or institutional appliances, for insulating medium and low temperature vessels and pipes, and for special building applications.

The present invention is illustrated by the following examples.

EXAMPLE I

Test panels were prepared by filling a 12"×12"×0.5" gas-permeable, flexible inner envelope with metered out volumes of coarse granules and fine particles, sealing this envelope, and mixing and compacting the contents, thereby forming a panel. The panel was placed inside a gas-impermeable intermediate envelope, and the air within the envelope replaced with a low conductivity gas. The Intermediate envelope was then evacuated and sealed, and placed inside a gas-impermeable outside envelope, which was then evacuated and sealed.

The R values of the test panels and of the commercially available styrofoam and polyisocyanurate foam panels were measured in a CPL relative conductivity apparatus calibrated against standards having known R values.

Examples showing the effect of various parameters on the performance of the panels are given below. The envelopes were as follows: inner gas-permeable envelope—polyester fabric; intermediate gas-impermeable envelope—polyethylene film; outer gas-impermeable envelope—composite barrier film. The envelopes were evacuated by external means to 0.1 millibar.

Panel #1
    Coarse granules: 0% by bulk volume
    Fine particles: 100% by bulk volume; expanded opacified silica; nominal diameter 10Å to 0.01 mm
    Interstitial gas; argon at 0.1 millibar pressure
    Density: 24.1 lb/ft$^3$
    Load-bearing capability: 2000 lbs/ft$^3$
    Flexibility: poor
    R-inch: 22
    This panel is a comparative panel, in that there are no coarse granules. Density was high but flexibility was poor.

Panel #2
    Coarse granules: 50% by bulk volume; expanded cellular polystyrene spheres; diameter greater than 2 mm up to 4 mm Fine particles: 50% by bulk volume; expanded silica, nominal diameter 10 Å to 0.01 mm
Interstitial gas; argon at 0.1 millibar pressure
Density: 9.3 lb/ft$^3$
Load-bearing capability 2000 lbs/ft$^3$
Flexibility: can be bent and will retain its shape after the removal of the bending force.
R-inch: 18.5

Although the R-value is lower than for Panel #1, it is still regarded as an excellent value. In addition this panel was flexible and the density was low.

Panel #3
Coarse granules: 70% by bulk volume; expanded cellular polystyrene spheres; diameter greater than 2 mm up to 4 mm
Fine particles: 30% by bulk volume; expanded silica, nominal diameter 10 Å to 0.01 mm
Interstitial gas; argon at 0.1 millibar pressure
Density: 7.9 lb/ft$^3$
Load-bearing capability 2000 lbs/ft$^3$
Flexibility: can be bent and will retain its shape after the removal of the bending force.
R-inch: 12.7

This panel also exhibited a good combination of low density, load-bearing capability, flexibility and R value.

EXAMPLE II

The R values of the recent commercially-available closed-cell foam insulations used by the freezer/refrigerator industry are given below for comparison.

Pentane-blown Polystyrene Foams
unaged—R-inch=5–6; aged—R-inch=5.
CFC-blown Polyisocyanurate Foams
unaged—R-inch=7–8; aged—R-inch less than 7.

The panels of the invention exhibited higher R values and flexibility than the above closed cell insulations.

What is claimed is:

1. Lightweight, partially evacuated load-supporting thermal insulation panel comprising an outer gas-impermeable envelope and an inner gas impermeable envelope, said inner envelope being filled with a mixture comprising lightweight coarse gas-permeable or semi-permeable granules forming a load-supporting structual framework, lightweight fine gas-permeable or semipermeable particles occupying void spaces between the granules, and low thermal conductivity gas filling void spaces formed within and between said granules and particles, said panel having a density of less than 10 lb/ft$^3$, said coarse granules having a nominal diameter of greater than 2 mm, and said panel being capable of being bent and retaining a shape so obtained.

2. Lightweight, partially evacuated load-supporting thermal insulation panel comprising an outer gas-impermeable envelope and an inner gas-permeable envelope, said inner envelope being filled with a mixture comprising lightweight coarse gas-permeable or semi-permeable granules forming a load-supporting structural framework occupying at least 30% of the volume of the panel, lightweight fine gas-permeable or semi-permeable particles occpying void spaces between the granules, and low thermal conductivity gas filling void spaces formed within and between said granules and particles, said panel having a density of less than 10 lb/ft$^3$, said coarse granules having a nominal diameter of greater than 2 mm, and said panel being capable of being bent and retaining a shape so obtained.

3. The panel of claim 2 in which the ratio of the bulk volume of the lightweight coarse granules to the bulk volume of the lightweight fine particles prior to their mixing and compaction is between 0.2 and 10.

4. The panel of claim 2 in which the lightweight coarse granules and the lightweight fine particles are granules and particles having a particle volume ratio of between 2 and 100.

5. The panel of claim 2 that is a flexible panel.

6. The panel of claim 2 in which the composition of the granules and particles is in the range of 1 to 5 parts by volume of the coarse granules and 1 to 5 parts by volume of the fine particles.

7. The panel of claim 2 in which the ratio of the diameters of the coarse granules to the fine particles is at least 50:1.

8. The panel of claim 7 in which the ratio of diameters is at least 100:1.

9. The panel of claim 2 in which the fine particles have a nominal diameter of 10 Å to 1 mm.

10. The panel of claim 9 in which the pressure of the low conductivity gas contained within the panel is within the range of 0.001 to 500 millibars.

11. The panel of claim 9 in which at least 60% by volume of the gas in the inner envelope is said low conductivity gas.

12. The panel of claim 2 in which the fine particles are a mixture of fine and ultrafine particles.

13. The panel of claim 2 in which the coarse granules or fine particles are made from at least one of synthetic or volcanic glasses, diatomaceous earth, wood and plant fibres, intertwined synthetic or natural solid and hollow fibres, cellulose and its derivatives, coke, charcoal, activated charcoal, fly ash, carbon, silica, zeolites, ceramics, rubbers or plastics.

14. The panel of claim 13 in which the plastic is at least one of porous or expanded forms of polyesters, polystyrene, polyurethane, polyisocyanurates, polyolefins, polyvinylchloride, epoxy resins, phenolic resins, urea formaldehyde, latex and silicone.

15. The panel of claim 2 in which the inner envelope contains at least 0.1% by weight of a getter.

16. The panel of claim 2 in which the inner envelope contains at least 0.1% by weight of at least of one activated charcoal, silica gel, zeolite, aluminum, titanium, barium, calcium and magnesium.

17. The panel of claim 2 in which the low conductivity gas is selected from at least one of argon, krypton, carbon dioxide, hydrochlorocarbons, hydrofluorocarbons, hydrochlorofluorocarbons, perfluorohydrocarbons, ethane, butane, propane, pentane, hexane and heptane.

18. The panel of claim 2 in which the R/inch value is greater than 8.

19. The panel of claim 2 which is located in a freezer, refrigerator, hot water heater or other domestic or institutional appliances.

20. Lightweight, partially evacuated load-supporting thermal insulation panel comprising an outer gas-impermeable envelope, an intermediate gas-impermeable envelope and an inner gas-permeable envelope, said inner envelope being filled with a mixtrue comprising lightweight coarse gas-permeable or semi-permeable granules forming a load-supporting structural framework occupying at least 30% of the volume of the panel, lightweight fine gas-permeable or semi-permeable particles occupying void spaces between the granules, and low thermal conductivity gas filling void spaces formed within and between said granules and particles, said panel having a density of less than 10 lb/ft$^3$, said coarse granules having a nominal diameter of greater than 2 mm, and said panel being capable of being bent and retaining a shape so obtained.

21. The panel of claim 20 in which the ratio of the bulk volume of the lightweight coarse granules to the bulk volume of the lightweight fine particles prior to their mixing and compaction is between 0.2 and 10.

22. The panel of claim 20 in which the lightweight coarse granules and the lightweight fine particles are granules and particles having a particle volume ratio of between 2 and 100.

23. The panel of claim 20 that is a flexible panel.

24. The panel of claim 20 in which the R/inch value is greater than 8.

25. The panel of claim 20 which is located in a freezer, refrigerator, hot water heater or other domestic or institutional appliances.

* * * * *